United States Patent
Suzuki et al.

(10) Patent No.: US 6,788,894 B2
(45) Date of Patent: Sep. 7, 2004

(54) INFORMATION PROCESSING APPARATUS EQUIPPED WITH DISPLAY DEVICE

(75) Inventors: Tatsuya Suzuki, Tokyo (JP); Hiroyuki Ando, Hachioji (JP)

(73) Assignee: Olympus Corporation (JP)

( * ) Notice: Subject to any disclaimer, the term of this patent is extended or adjusted under 35 U.S.C. 154(b) by 164 days.

(21) Appl. No.: 10/022,620

(22) Filed: Dec. 20, 2001

(65) Prior Publication Data

US 2002/0081115 A1 Jun. 27, 2002

(30) Foreign Application Priority Data

Dec. 22, 2000 (JP) ....................................... 2000-390574

(51) Int. Cl.[7] .............................................. G03B 17/02
(52) U.S. Cl. ...................... 396/287; 396/535; 361/681; 349/58; 348/333.01; 348/373
(58) Field of Search ................... 396/287–292, 396/535; 349/58–60; 348/825, 333.01; 361/681

(56) References Cited

U.S. PATENT DOCUMENTS 5,570,267 A * 10/1996 Ma .............................. 361/581
6,064,453 A * 5/2000 Inubushi et al. .............. 349/58
6,507,377 B1 * 1/2003 Jung ........................... 349/60

* cited by examiner

Primary Examiner—David M. Gray
(74) Attorney, Agent, or Firm—Volpe and Koenig, P.C.

(57) ABSTRACT

A digital camera includes an outer casing cover. An open portion is formed in the outer casing cover, and an LCD unit is mounted to the open portion such that the display surface of the LCD unit is exposed to the outside through the open portion. The LCD unit includes a plate-like LCD module of a package type and a mounting frame having the LCD mounted thereto. The mounting frame is formed of a thin member such as a thin metal plate, and the holding frame for housing and holding the display element includes a display frame covering the peripheral portion of the display surface. The display surface and the display frame are exposed to the outside through the open portion of the outer casing member.

7 Claims, 6 Drawing Sheets

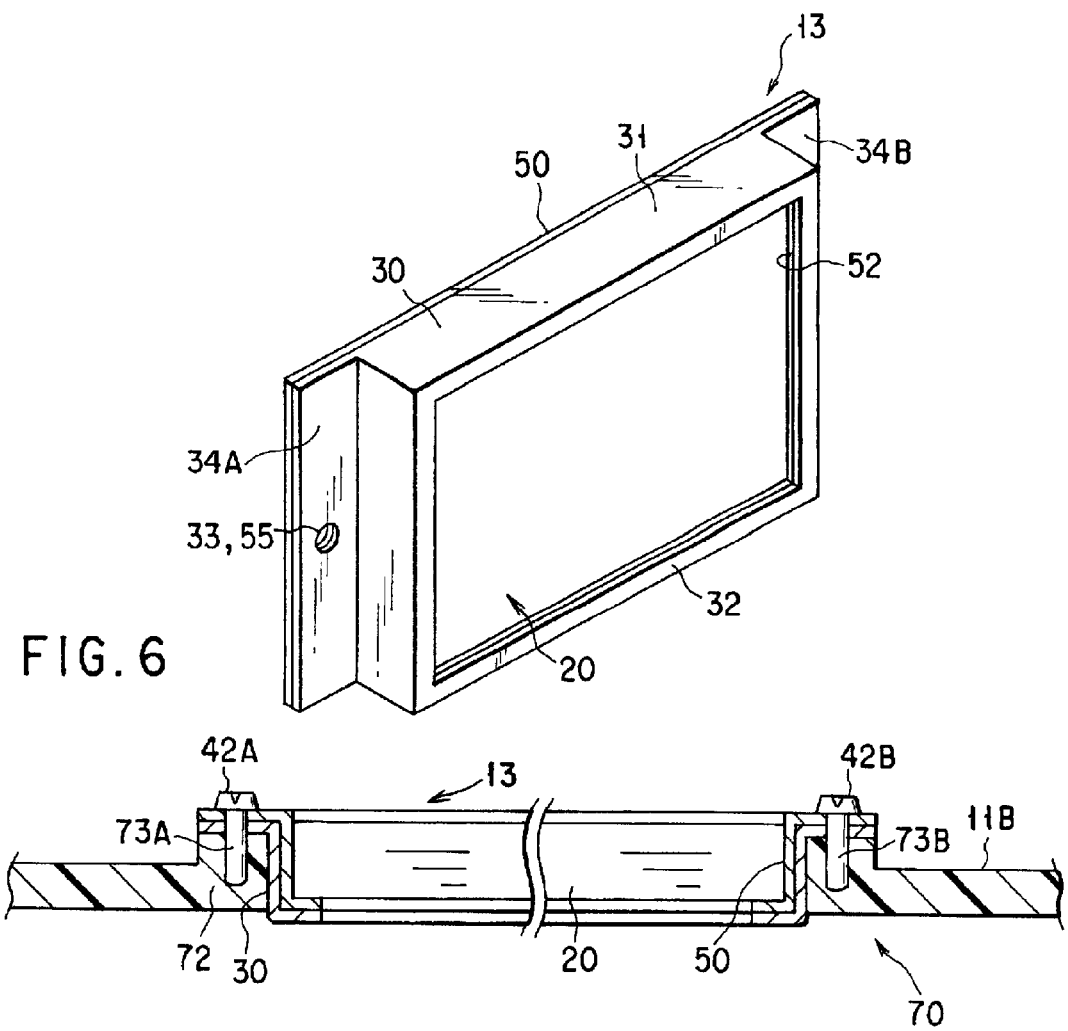
FIG. 6
FIG. 7
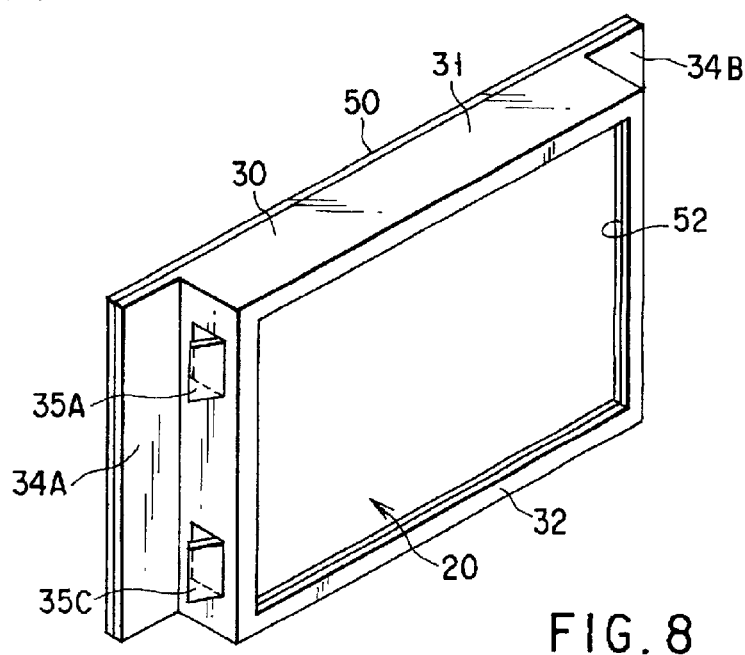
FIG. 8

INFORMATION PROCESSING APPARATUS EQUIPPED WITH DISPLAY DEVICE

CROSS-REFERENCE TO RELATED APPLICATIONS

This application is based upon and claims the benefit of priority from the prior Japanese Patent Application No. 2000-390574, filed Dec. 22, 2000, the entire contents of which are incorporated herein by reference.

BACKGROUND OF THE INVENTION

1. Field of the Invention

The present invention relates to an information processing apparatus equipped with a display device, particularly, to an improvement of a mounting structure for mounting a liquid crystal display unit (hereinafter referred to simply as an LCD unit) to an information processing apparatus equipped with a display device such as a digital camera.

2. Description of the Related Art

In an information processing apparatus such as a digital camera, the portability is of a high importance, and a very high demand is being directed to the miniaturization of the apparatus, particularly, to the reduction in the thickness of the apparatus. The information processing apparatus of this kind is equipped in many cases with an LCD unit for displaying information such as a photographed image on the back surface of, for example, an outer cover. The LCD unit is generally formed thin and, thus, is highly desirable for use in a portable information processing apparatus such as a digital camera, which strongly requires the reduction in the thickness of the apparatus.

The digital camera equipped with an LCD unit has a back surface structure as shown in FIGS. 1A and 1B, wherein FIG. 1A is an oblique view showing the back surface of a digital camera 90, and FIG. 1B is a side view showing the left-side surface of the digital camera 90. In general, the digital camera 90 comprises an outer cover 91 prepared by an injection molding of, for example, a plastic material. An open portion 92 is formed in the outer cover 91. A LCD module 93 for displaying the photographed image is mounted to the open portion 92 such that the display surface of the LCD module 93 is exposed to the outside.

The outer cover 91 has a mounting structure as shown in, for example, FIGS. 2 and 3, to which the LCD module 93 is mounted. FIG. 2 is a cross sectional view schematically showing the construction along the line II—II shown in FIG. 1, and FIG. 3 is a cross sectional view schematically showing the state that the LCD module 93 is separated from the outer cover 91 having the mounting structure as shown in FIG. 2. As shown in FIGS. 2 and 3, the LCD module 93 comprises an LCD as a planar display element having the display surface protected by, for example, a glass. The LCD is housed in a metal package 95 holding the LCD such that the display surface of the LCD can be recognized from the outside. The metal package 95 includes a pair of mounting flanges 95A, 95B extending from both sides of a frame body for mounting the metal package 95 to the outer cover 91. Through-holes 95C and 95D for inserting mounting screws are formed in the flanges 95A and 95B, respectively, as shown in FIG. 3. Also, a peripheral portion 95E covering in a band-like fashion the peripheral portion of the display surface of the LCD and defining a window is formed in the metal package 95.

Incidentally, a flexible cable (not shown) for connecting the LCD to an outer circuit extends from the metal package 95.

An open portion 92 has a shape and a size conforming with the LCD module 93 so as to receive the LCD module 93, and a mounting boss 96 having a pair of screw holes 96A, 96B is arranged in a peripheral portion inside the outer cover 91 defining the open portion 92. Also, a window frame 96C covering the peripheral portion of the display surface of the mounted LCD module 93 is formed in the peripheral portion outside the outer cover 91 defining the open portion 92. The window frame portion 95E is mainly intended to prevent the peripheral portion 95E of the metal package 95 in the peripheral portion of the display surface of the LCD from being exposed directly to the outside so as to not to impair the outer appearance and is formed to project to the outside from the outer cover 91.

As shown in FIG. 3, when the LCD module 93 is mounted to the open portion 92, the peripheral portion on the side of the display surface of the LCD module 93 is allowed to abut against the inner surface of the window frame portion 96C of the open portion 92 so as to allow the display surface of the LCD to be observed through the open portion 92. Also, the mounting flanges 95A, 95B of the metal package 95 are screwed to the mounting boss 96 by mounting screws 97A, 97B. As a result, the LCD module 93 is mounted to a digital cameral body 91.

However, a serious problem is generated in the conventional LCD mounting structure described above. It should be noted that, since the outer cover 91 is formed by the injection molding of, for example, a plastic material, it is necessary for the window frame portion 96C to have an ordinary thickness of about 1.5 mm. The particular thickness is added as it is as a thickness of the digital camera body 90, resulting in failure to reduce the thickness of the apparatus because of the increased thickness of the window frame portion 96C in spite of the use of the LCD having a merit of a small thickness. In addition, the window frame portion 96 projects to the outside so as to impair the outer appearance.

BRIEF SUMMARY OF THE INVENTION

An object of the present invention is to provide an information processing apparatus having an improved structure for mounting a display unit.

In the improved mounting structure, it suffices for the protruding amount of the display device mounting section protruding on the surface of the outer casing member to be light so as to contribute to the further reduction in the thickness of the information processing apparatus constructed such that the display surface of the plate-type display device constitute a part of the outer casing member.

Also, in the improved mounting structure, the peripheral structure of the open portion for mounting the display device of the outer casing is simplified so as to facilitate the manufacture of the outer casing member.

According to a first aspect of the present invention, there is provided an information processing apparatus, comprising:

a plate-like display device including a plate-like display element having a display surface, and a cover holding the plate-type display element so as to expose the display surface of the plate-like display element to the outside, the cover having a first mounting section;

a mounting member for mounting the display device, the mounting member including a window frame having a second mounting section and covering the display device in a manner to expose the display surface of the plate-like display device to the outside; and an outer casing member defining an open portion in which the mounting member is fixed, including a fixing base for fixing the first and second mounting sections;

wherein, under the state that the mounting member
mounting the display device is mounted to the open
portion of the outer casing member so as to permit the
mounting member to be fixed to the fixing base, the
display surface and the window frame of the plate-like
display device are exposed to the outside of the outer
casing member.

According to a second aspect of the present invention,
there is provided an information processing apparatus, comprising:

a package type plate-like display device including an
LCD plate-like display element having an LCD display
surface and a cover for holding the display element in
a manner to expose the display surface of the display
element to the outside;

a mounting member for mounting the plate-like display
device, the mounting member including a window
frame having a second mounting section and covering
the plate-like display device in a manner to expose the
display surface of the display device to the outside; and an outer casing member defining an open portion in which
the mounting member mounting the display device is
mounted and including a fixing base for fixing the first
and second mounting sections;

wherein, under the state that the mounting member
mounting the display device is mounted to the open
portion of the outer casing member so as to permit the
mounting member to be fixed to the fixing base, the
display surface and the window frame of the display
device are exposed to the outside of the outer casing
member.

Further, according to a third aspect of the present
invention, there is provided an information processing
apparatus, comprising:

a plate-like display device including a plate-like display
element having a display surface;

a mounting member for mounting the plate-like display
device, the mounting member including a window
frame covering the display device in a manner to
expose the display surface of the display device to the
outside; and an outer casing member defining an open portion in which
the mounting member mounting the display device is
mounted, including a fixing base for fixing the mounting member;

wherein, under the state that the mounting member
mounting the display device is mounted to the open
portion of the outer casing member so as to permit the
mounting member to be fixed to the fixing base, the
display surface and the window frame of the plate-like
display device are exposed to the outside of the outer
casing member.

Additional objects and advantages of the invention will be
set forth in the description which follows, and in part will be
obvious from the description, or may be learned by practice
of the invention. The objects and advantages of the invention
may be realized and obtained by means of the instrumentalities and combinations particularly pointed out hereinafter.

BRIEF DESCRIPTION OF THE SEVERAL
VIEWS OF THE DRAWING

The accompanying drawings, which are incorporated in
and constitute a part of the specification, illustrate embodiments of the invention, and together with the general
description given above and the detailed description of the
embodiments given below, serve to explain the principles of
the invention.

FIG. 6 is an oblique view schematically showing the LCD
unit shown in FIG. 4A;

FIG. 7 is a cross sectional view schematically showing the
LCD unit and its mounting structure along the line VII—VII
shown in FIG. 4A;

FIG. 8 is an oblique view schematically showing the LCD
unit mounted to a mounting structure of a digital camera
equipped with an LCD unit according to another embodiment of the present invention;

DETAILED DESCRIPTION OF THE
INVENTION

A digital camera will now be described with reference to
the accompanying drawings as an information processing
apparatus according to some embodiments of the present
invention.

(First Embodiment)

Figure 1A:
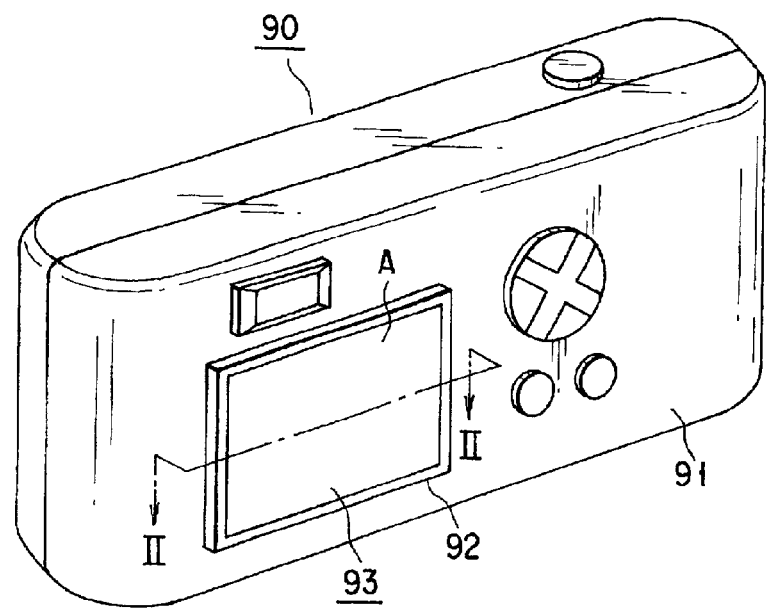
FIG. 1A is an oblique view schematically showing the
outer appearance of the back surface of a conventional
digital camera equipped with an LCD unit.
Figure 1B:
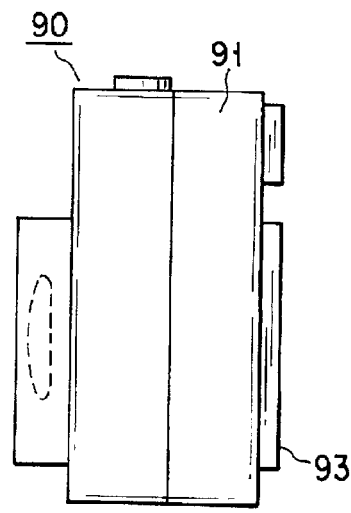
FIG. 1B is a side view showing the left-side surface of the
digital camera shown in FIG. 1A.
Figure 2:
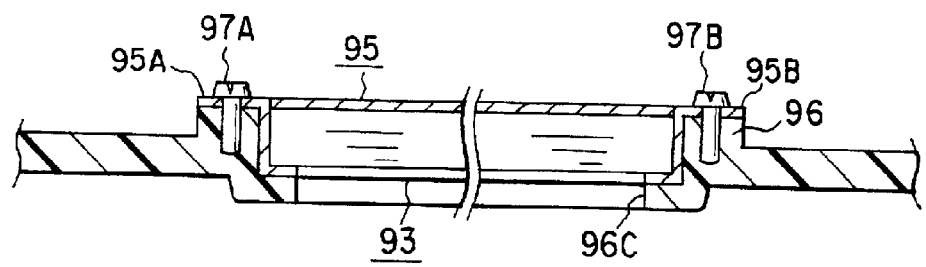
FIG. 2 is a cross sectional view schematically showing the
construction of the LCD unit and its mounting structure
along the line II—II shown in FIG. 1A.
Figure 3:
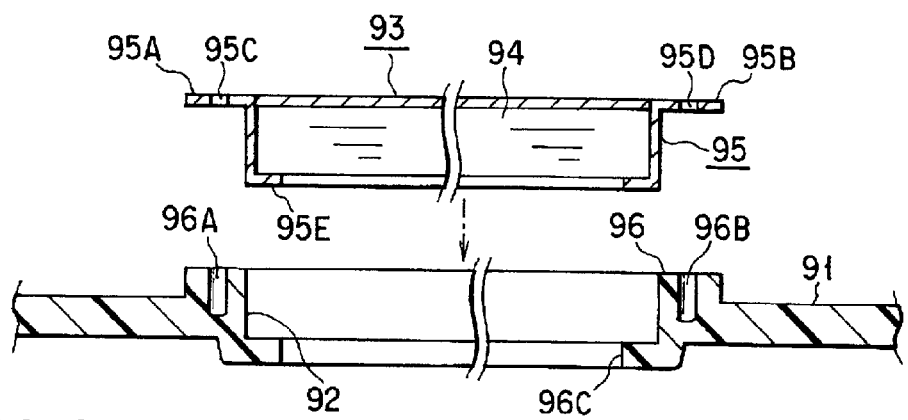
FIG. 3 is a cross sectional view schematically showing the
state that the LCD unit is separated from the mounting
structure shown in FIG. 2.
Figure 4A:
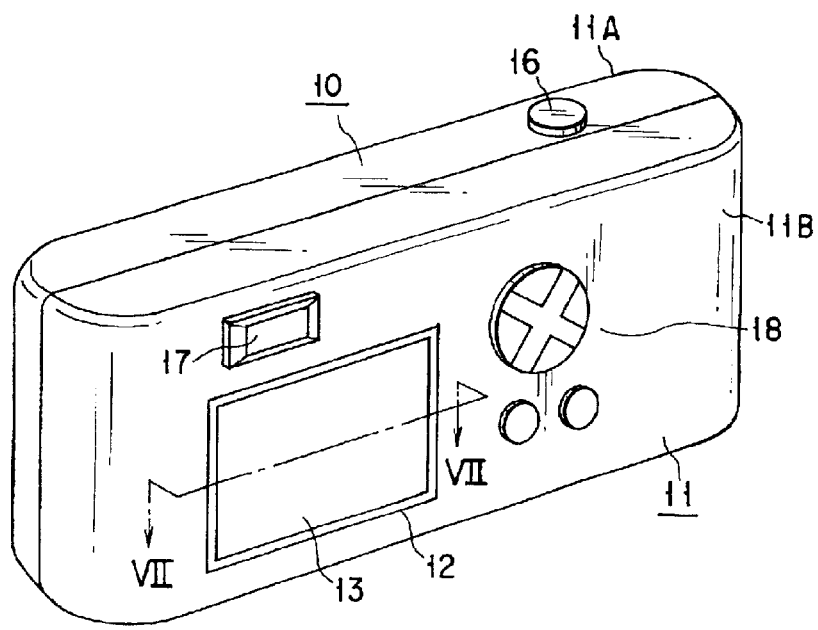
FIG. 4A is an oblique view schematically showing the
outer appearance of the back surface of a digital camera
equipped with an LCD unit according to one embodiment of
the present invention.
Figure 4B:
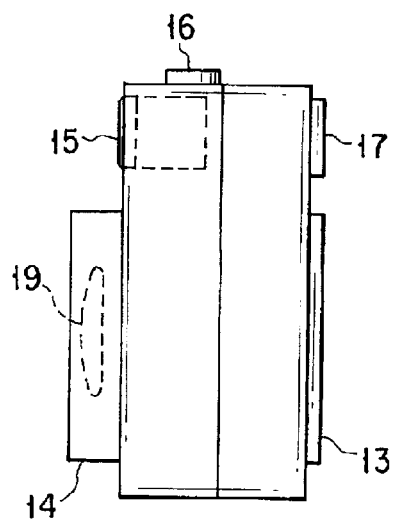
FIG. 4B is a side view showing the left side of the digital
camera shown in FIG. 4A.

FIG. 4A is an oblique view schematically showing the
back surface of a digital cameral as an information processing apparatus according to a first embodiment of the present
invention, and FIG. 4B is a side view schematically showing
the left side of the digital camera shown in FIG. 4A.

A reference numeral 10 shown in FIG. 4A denotes an
information processing apparatus body, i.e., a digital camera
body. The electronic circuit and the camera mechanism
inside the digital cameral body 10 is covered with an outer
casing member, i.e., a camera outer casing cover, comprising
a front cover 11A and a rear cover 11B. The outer casing
cover 11 is generally formed by the injection molding of, for
example, a plastic material. An open portion 12 for mounting an LCD unit 20 as a display device is formed in a part
of the outer casing member 11. To be more specific, the open
portion 12 is formed in a left portion of the rear cover 11B.

A display surface of the LCD unit 20 is exposed to the outside in the open portion 12 such that the display surface of the LCD unit 20 can be observed from the outside. The information for operating the digital camera body 10 or the information processed by the internal electronic circuit, i.e., a photographed image or the like, is displayed on the display surface of the LCD unit 13.

As shown in FIG. 4B, a lens barrel 14 housing a photographing lens 19 and a stroboscopic unit 15 emitting a stroboscopic light in the photographing step are arranged on the front surface of the front cover 11A, and a release button 16 is arranged on the upper surface of the front cover 11A. On the other hand, a finder ocular window 17, an operation mode switching button 18, etc. are mounted to the outer surface of the rear cover 11B.

The LCD unit 13 mounted to the open portion 12 shown in FIGS. 4A and 4B comprises an LCD module 20 as a plate-type display module having the display surface protected by, for example, a glass, and a mounting frame 30 for mounting the LCD module 20 to the open portion 12. The LCD module 20 is of a package type covered with a metal package. Incorporated in the package type LCD module 20 are not only a liquid crystal display element used as a display element but also a back light providing a light source of the liquid crystal display element. In the package type LCD module 20, a frame section 52 defining a rectangular window surface of the display element is formed on the front surface of the box-shaped metal package 50, and mounting flanges 54A, 54B are mounted on the rear side of the box-shaped metal package 50 in a manner to extend outward from a side section 53. Screw holes 55 for mounting the LCD unit 13 to the open portion 12 of the rear cover 11B are formed in the mounting flanges 54A and 54B.

Figure 5:
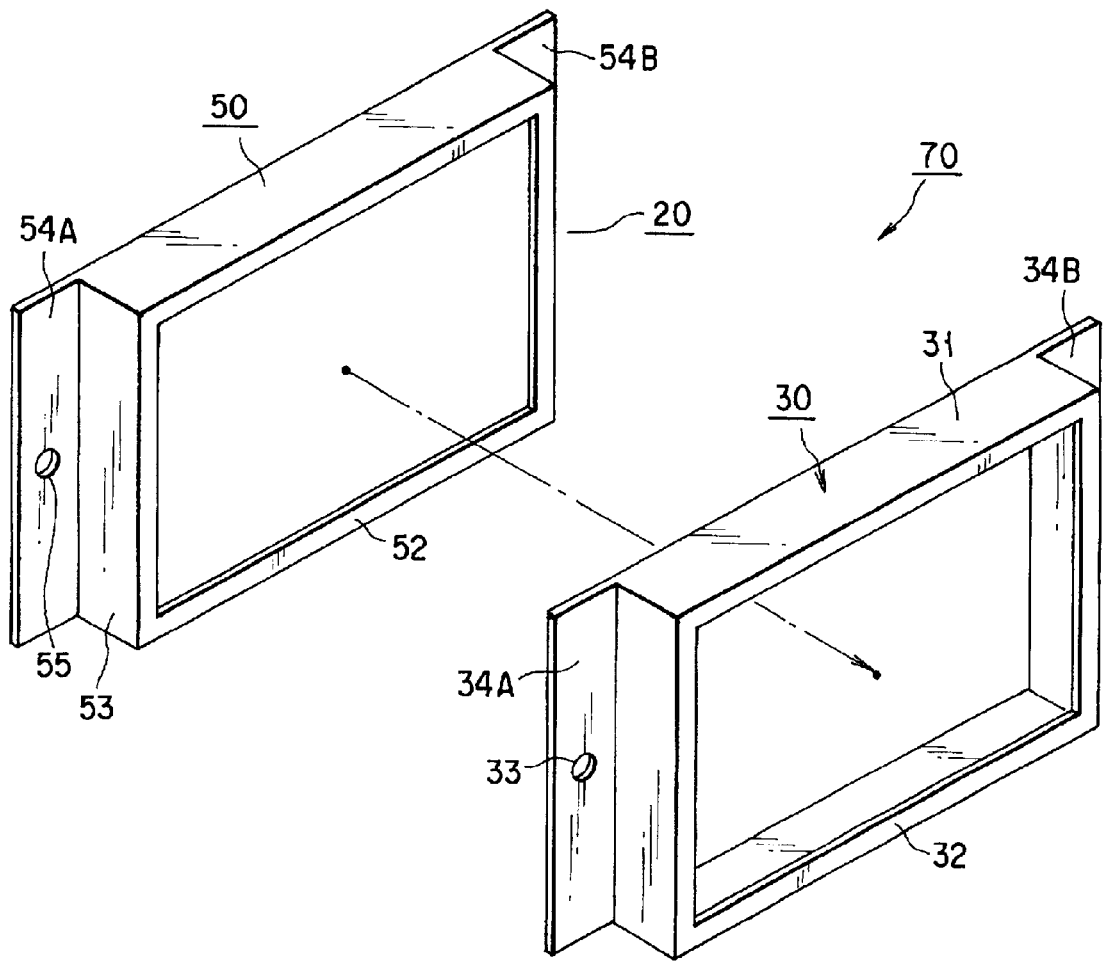
FIG. 5 is an oblique view schematically showing in a
dismantled fashion the LCD unit shown in FIG. 4A.

The packaged LCD module 20 is inserted into the inner region of the mounting frame 30 as denoted by an arrow of a broken line in FIG. 5 so as to to be assembled into the LCD unit 13 as shown in FIG. 6.

The mounting frame 30 is formed of a metal thin plate, e.g., an aluminum alloy thin plate that can be bent, and includes a box-shaped frame section 31 housing the LCD module 20 and a frame section 32 provided on the inner periphery of the frame section 31 as shown in FIG. 5. The frame section 32 is so extended from the frame section 31 as to define a rectangular window of the display surface on the front surface.

The frame section 32 is exposed to the outside. Thus, it may be colored substantially the same as the color of the outer surface of the outer casing 11 or may be colored with a different color as that of the outer surface of the outer casing 11 so as to provide a good appearance of the casing 11 in accordance with a designing policy.

The box-shaped frame section 31 includes mounting flanges 34A, 34B formed on the rear side and extending outward from the side surfaces of the frame section 31. Further, screw holes 33 corresponding to the screw holes 55 of the LCD module 20 are formed in the mounting flanges 34A, 34B. In the LCD unit 13, the mounting flanges 54A, 54B of the LCD module 20 may be fixed to the mounting flanges 34A, 34B of the frame section 31 with an adhesive material or an another member to form a unity structure.

The LCD unit 13 is mounted to the open portion 12 of the rear cover 11B, as shown in FIG. 7. A mounting structure 70 for mounting the LCD unit 13, which defines the open portion 12, is mounted to the rear cover 11B around the open portion 12, as shown in FIG. 7. In this mounting structure, a boss 72 to which the mounting flanges 34A, 34B of the LCD unit 13 shown in FIG. 6 are fixed is arranged in the vicinity of the open portion 12. The boss 72 projects inward the rear cover 11B and is provided with screw holes 73A, 73B corresponding to the screw holes 55, 33, respectively. The boss 72 is formed in the form of a frame for conforming with the LCD unit 13. The inner circumferential wall of the boss 72 defines the open portion 12 as described previously. As shown in FIG. 7, the LCD unit 13 is engaged with the open portion 12, and screws 42A, 42B are inserted into the screw holes 73A, 73B through the screw holes 55, 33, respectively, so as to fix the LCD unit 13 to the boss 72 securely without fail.

In the mounting structure 70 in which the LCD unit 13 is mounted to the open portion 12, the outer surface of the structure 70 is formed substantially flat and, as shown in FIG. 7, only the display surface and the frame section 32 of the LCD unit 13 are exposed to the outside. The frame section 32 protrudes only slightly from the outer surface of the structure 70 or forms a substantially flat continuous surface.

Incidentally, the mounting frame 30 is not limited to that which is formed by a metal thin plate capable of a bending treatment. For example, the mounting frame 30 can be formed by applying a die cast processing using, for example, aluminum.

(Second Embodiment)

Figure 9:
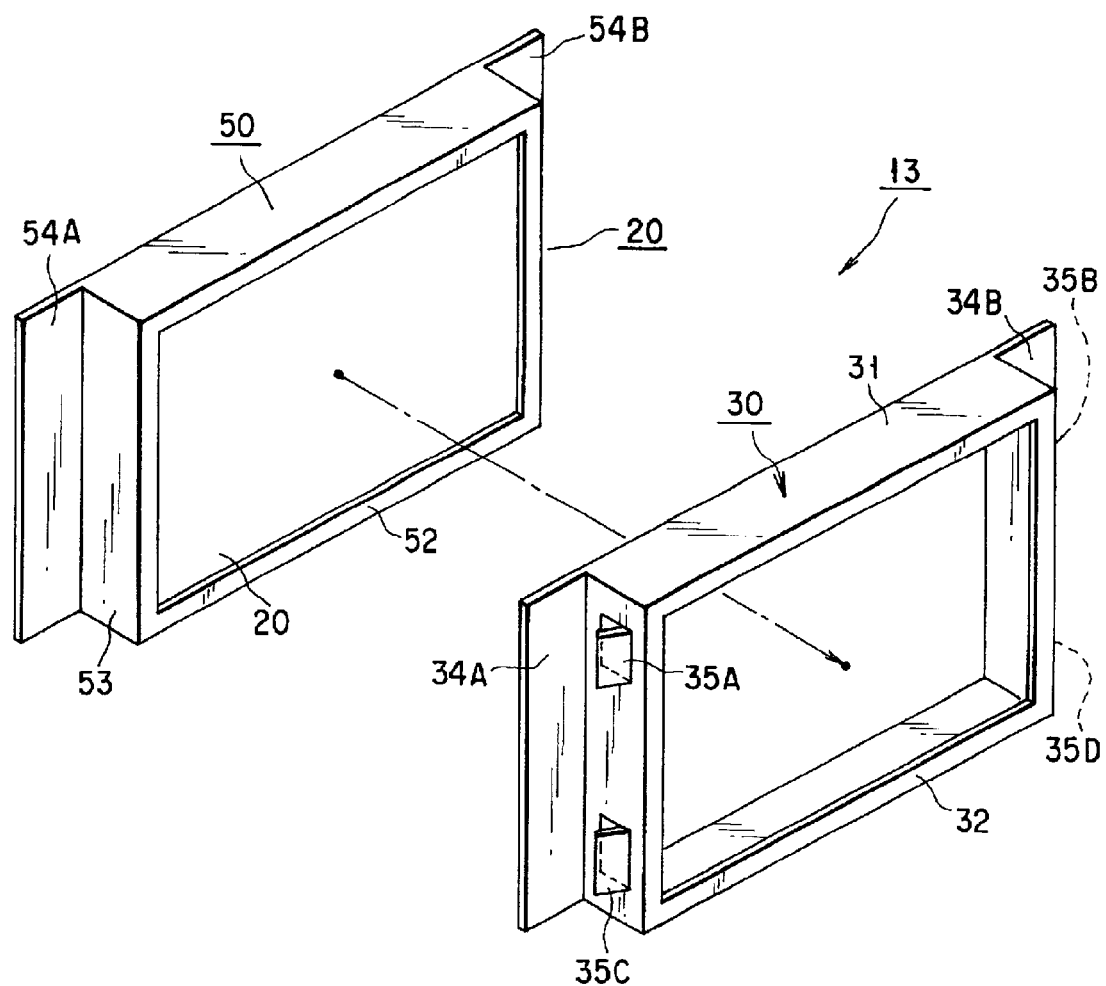
FIG. 9 is an oblique view schematically showing in a
dismantled fashion the LCD unit shown in FIG. 8.
Figure 10:
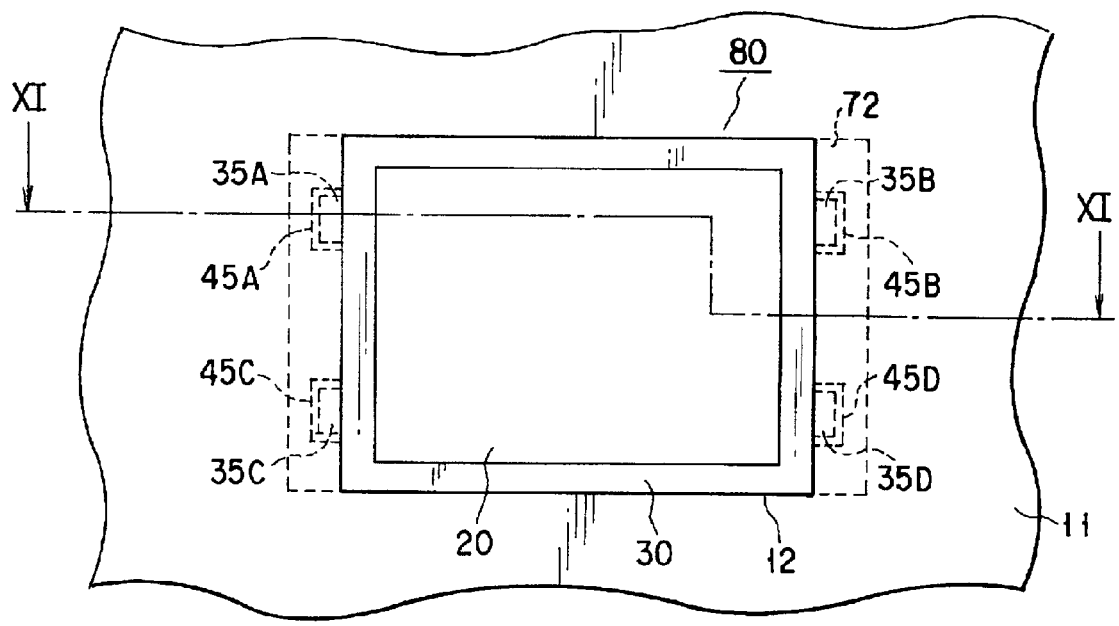
FIG. 10 is a plan view schematically showing in a broken
fashion the mounting structure of a digital camera equipped
with an LCD unit according to still another embodiment of
the present invention.

An LCD unit and its mounting structure according to a second embodiment of the present invention will now be described with reference to FIGS. 8 to 11. FIG. 8 is an oblique view schematically showing an LCD unit mounted to the display surface of a digital camera according to the second embodiment of the present invention, FIG. 9 is an oblique view showing in a dismantled fashion the LCD unit shown in FIG. 8, FIG. 10 is a plan view schematically showing in a broken fashion the display surface of the digital camera in which is mounted the LCD unit shown in FIG. 8 and the inner structure of the mounting section of the display surface noted above, and FIG. 11 is a cross sectional view schematically showing the construction along the line XI—XI shown in FIG. 10. Since the LCD unit and its mounting structure according to the second embodiment of the present invention is similar to the LCD unit and its mounting structure according to the first embodiment in the basic construction, the same portion and the same member of the apparatus is denoted by the same reference numeral so as to avoid the overlapping description.

The LCD unit 13 shown in FIGS. 8 and 9 comprises the LCD module 20 as a plate-like display element and the mounting frame 30 to which the LCD module 20 is mounted like the LCD unit 13 shown in FIGS. 5 and 6. The LCD module 20 shown in FIG. 9 is of a package type, which is covered with a metal package, like the LCD unit 13 shown in FIG. 5. The frame section 52 defining a rectangular window of the display surface is formed on the front surface of the box-shaped metal package 50, and the mounting flanges 54A, 54B are mounted to the back surface of the box-shaped metal package 50 in a manner to extend outward from the side walls 53.

The packaged LCD module 20 is inserted into the inner region of the mounting frame 30 as denoted by an arrow of a broken line in FIG. 9 so as to be assembled into the LCD unit 13 as shown in FIG. 6.

As shown in FIG. 8, the mounting frame 30 is formed of a metal thin plate, e.g., an aluminum alloy thin plate that can be subjected to a bending processing, like the mounting frame 30 shown in FIG. 5, and includes a box-shaped frame section 31 for housing and holding the LCD module 20. The box-shaped frame section 31 includes the frame section 32 formed on the front surface for defining a rectangular window of the display surface 20. Since the frame section 32 is exposed to the outside, the frame section 32 may be made substantially equal to the outer casing cover 11 in the color or may be colored with a different color as that of the outer casing cover 11 so as to provide a good appearance in accordance with a designing purpose. The box-shaped frame section 31 includes the mounting flanges 34A, 34B formed on the side of the back surface in a manner to extend outward from the side walls of the frame section 31. The screw holes 33 are not formed in the mounting flanges 34A, 34B shown in FIGS. 8 and 9, and an engaging mechanism is formed in place of the screw holes 33 shown in FIGS. 5 and 6. To be more specific, the frame section 31 is partly recessed to form tongue pieces 35A, 35B, 35C, 35D in the frame section 31 as the engaging mechanism. These tongue pieces 35A, 35B, 35C, 35D are folded outward. FIG. 9 shows that the tongue pieces 35A, 35B are formed in the side wall section of the frame section 31. However, it is also possible to form the tongue pieces on the upper and lower sections of the frame section 31, or on the side section, the upper section and the lower section of the frame section 31.

Figure 11:
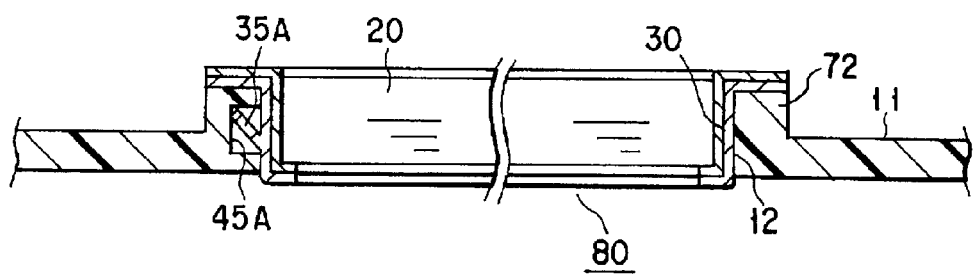
FIG. 11 is a cross sectional view schematically showing
the LCD unit and its mounting structure along the line
XI—XI shown in FIG. 10.

The LCD unit 13 is mounted to the open portion 12 of the rear cover 11B, as shown in FIG. 11. The mounting structure 80 for mounting the LCD unit 13, which defines the open portion 12, is formed in the rear cover 11B in the vicinity of the open portion 12, as shown in FIGS. 10 and 11. In this mounting structure, the boss 72 to which the mounting flanges 34A, 34B of the LCD unit 13 shown in FIG. 11 are fixedly contacted is arranged in the vicinity of the open portion 12. The 72 is projected inward the rear cover 11B. The boss 72 is formed in the shape of a frame for conforming with the LCD unit 13. As described previously, the inner circumferential surface of the boss 72 defines the open portion 12, and the LCD unit 13 is engaged with the open portion 12, as shown in FIG. 11. The LCD unit 13 is securely fixed to the boss 72 with a following engaging mechanism. That is, recesses 45A, 45B, 45C, 45D engaged with the tongue pieces 35A, 35B, 35C, 35D, respectively, formed in the frame section 31 of the LCD unit 13 are formed in a manner to correspond to the tongue pieces 35A, 35B, 35C, 35D in the inner side surface of the boss 72. When the LCD unit 13 is mounted to the open portion 12, the tongue pieces 35A, 35B, 35C, 35D are slid along the inner side surface of the boss 72 while maintaining the spring force. The spring force of the tongue pieces 35A, 35B, 35C, 35D is released within the recesses 45A, 45B, 45C, 45D, respectively, with the result that the tongue pieces 35A, 35B, 35C, 35D are engaged with the inner surfaces of the recesses 45A, 45B, 45C, 45D, respectively, so as to permit the LCD unit 13 to be fixed to the boss 72 without fail. In this case, the frame 32 slightly projects from the outer surface of the structure 70 or forms a substantially flat consecutive surface.

In fixing the LCD unit 13 to the boss 72, the mounting flanges 34A, 34B of the LCD unit 13 may be bonded to the boss 72 with an adhesive so as to permit the LCD unit 13 to be mounted to the digital camera body 10 more securely. In an alternative embodiment of the present embodiment, the screw holes 73A, 73B may be formed on the boss 72 as shown in FIG. 7 and the screw holes 55, 33 corresponding to the holes 73A, 73B may also formed on the mounting flanges 34A, 34B of the LCD unit 13, in addition to the engaging mechanism. Thus, the screws 42A, 42B may be inserted into the screw holes 73A, 73B through the screw holes 55, 33, respectively, so as to fix the LCD unit 13 to the boss 72, more securely.

In the mounting structure described above, only the display surface and the frame section 32 of the mounting frame 30 defining a rectangular window of the display surface are exposed to the outside through the open portion 12 of the outer casing cover 11 as shown in FIG. 11 like the first embodiment described previously. The frame section 32 has a sufficiently large thickness corresponding to the thickness of the metal material formed in the mounting structure 30, and the frame section 32 alone is allowed to project from the open portion 12 of the outer casing cover 11. As a result, it is possible to make the projecting portion projecting outward from the outer casing cover 11 very small and to make the outer appearance of the outer casing cover 11 substantially flat. It follows that it is possible to suppress without fail the increase in the thickness of the entire information processing apparatus including the display surface of the plate-like display device 13 as a part of the outer casing member 11 so as to reduce the thickness of the information processing apparatus.

It should also be noted that, in the apparatus described above, it suffices to form the open portion 12 for mounting the display device in the outer casing member 11 as in the first embodiment, making it unnecessary to form a window frame portion protruding outside and covering the peripheral portion of the display device from the outside in the vicinity of the open portion of the outer casing member as in the prior art. It follows that the peripheral structure of the open portion 12 for mounting the display device of the outer casing member 11 can be simplified so as to facilitate the manufacture of the outer casing member 11 and, thus, to reduce the thickness or appearance volume of the outer casing member and provide a substantially flat outer surface to the outer casing member with minimizing the height of the mount section protruding from the rear surface of the outer casing.

In the apparatus described above, the metal plate forming the mounting frame 30 has a mechanical strength and a toughness higher than those of the injection molded part of the plastic material forming the outer casing member. Therefore, it is possible to make the thickness of the peripheral portion 32 of the mounting frame 30 projecting from the surface of the outer casing member 11 as small as possible.

Further, the LCD module 20 is of a package type covered with the metal package 50, and the package type LCD module 20 is mounted to the mounting frame 30 so as to be mounted to the open portion 12 of the outer casing member. In the particular construction, the peripheral portion of the LCD module 20 is concealed by the peripheral portion 32 of the mounting member 30, with the result that it is possible for the outer casing member 11 to prevent the peripheral portion 52 of the metal package 50 from being exposed to the outside so as to impair the outer appearance. In addition, even if the open portion 12 is formed in the outer casing member, the packaged LCD module 20 is mounted to the mounting frame 30 so as to be mounted to the open portion of the outer casing. It follows that it is possible to impart a sufficient mechanical strength to the open portion 12. A color or texture of the peripheral portion 32 of the mounting member 30 may be arbitrary selected in accordance to the design purpose to apply a good appearance to the casing.

What should also be noted is that, in the apparatus according to the second embodiment of the present invention, the engaging portions 35A to 35D formed in the open portion 12 of the outer casing member 11 are engaged with the inner surfaces of the recesses 45A, 45B, 45C, 45D so as to permit the LCD unit 13 to be fixed to the boss 72 without fail. When the LCD unit 13 is mounted to the open portion 12, the LCD unit 13 can be mounted by simply performing an inserting operation. Since special mounting operations such as the screwing are not required, the apparatus can be assembled easily.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:

an outer casing member having an inner surface, an outer surface, a first substantially rectangular open portion configured to define a first rectangular opening which penetrates the outer casing, and a fixing base portion provided on the inner surface of the first open portion;

a display module including a display element having a rectangular display surface, and a first cover structure formed of a thin plate having a first frame portion configured to define a second opening, a first holding portion configured to receive and hold the display element so as to expose the display surface in the second opening, and a first mounting portion extending from the first holding part; and a second cover structure formed of a thin plate and having a second frame portion configured to define a third opening portion having a same size as that of the second opening, a second holding portion configured to receive and hold the first holding portion so as to align the third opening with the second opening and expose the display surface in the third opening, and a second mounting portion extending from the second holding portion;

wherein the first and second mounting portions are contacted each other and are fixed to the fixing base portion, the second mounting portion is fitted into the first opening as to expose the display surface and the second frame portion in the first opening, and the second frame portion and the outer surface of the casing member is arranged to form a substantial continuous surface.

2. The apparatus according to claim 1, wherein the outer casing member is formed of a resin material and the first and second covers are made of metal.

3. The apparatus according to claim 1, wherein the first and second mounting portions are formed into flange portions extending approximately parallel to the inner surface of the outer casing member and serving as stopper for preventing the first and second covers from being detached from the outer surface.

4. The apparatus according to claim 1, wherein the outer surface of the outer casing member and the display surface of the display plate part are on an approximately identical face.

5. The apparatus according to claim 1, wherein the holding portion is provided with a rectangular frame extending along the peripheral edge of the display surface and has a substantially same color as that of the outer casing member.

6. The apparatus according to claim 1, wherein engaging portions are formed on a side wall surface of the open portion provided on the outer casing member and a corresponding portion of the second cover engaging with the side wall surface to prevent the side wall surface and the corresponding portion from being detached from each other.

7. The apparatus according to claim 6 wherein an engagement recess portion is formed on the side wall surface of the first open portion, an engagement projection portion engaging with the engagement recess portion is formed on the corresponding portion of the second cover, and the engagement projection portion serves as a pawl elastically deformed and inserted into the engagement recess portion.

* * * * *